Dec. 28, 1937.  M. HOLHUT ET AL  2,103,531
POURING JIG
Filed Sept. 16, 1936  2 Sheets-Sheet 1

INVENTOR
Michael Holhut.
Walter G Vollmer.
By
ATTORNEY

Dec. 28, 1937.  M. HOLHUT ET AL  2,103,531
POURING JIG
Filed Sept. 16, 1936    2 Sheets-Sheet 2

INVENTOR
Michael Holhut.
Walter G. Vollmer.
BY
ATTORNEY

Patented Dec. 28, 1937

2,103,531

UNITED STATES PATENT OFFICE 2,103,531

POURING JIG

Michael Holhut and Walter G. Vollmer, St. Louis, Mo., assignors to H & H Machine & Motor Parts Co., St. Louis, Mo., a corporation of Missouri Application September 16, 1936, Serial No. 101,006

3 Claims. (Cl. 22—123)

This invention relates generally to tools and devices for the pouring and molding of molten metal and, more particularly, to a certain new and useful improvement in jigs for the pouring of metal for the formation of automotive engine bearings and the like.

Our invention has for its chief object the provision of a jig or tool which may be utilized for the pouring and molding of metal members, such as automobile main bearings and the like, in a simple, efficient, and unitary operation, without waste of metal and in exact conformation to the portion of the cylinder block in which the main bearing is positioned.

Our invention has for another object the provision of a pouring jig or tool equipped with an air-cooled molten metal retaining chamber and which is so constructed for association with standard parts of a standard automobile engine block in such manner that the metal retaining chamber may be moved or shifted with respect to the poured bearing for shearing off excess metal substantially flush with the marginal surface of the entire bearing structure.

And with the above and other objects in view, our invention resides in the novel features of form, construction, arrangement, and combination of parts presently described and pointed out in the claims.

In the accompanying drawings (2 sheets),—

Figure 1:
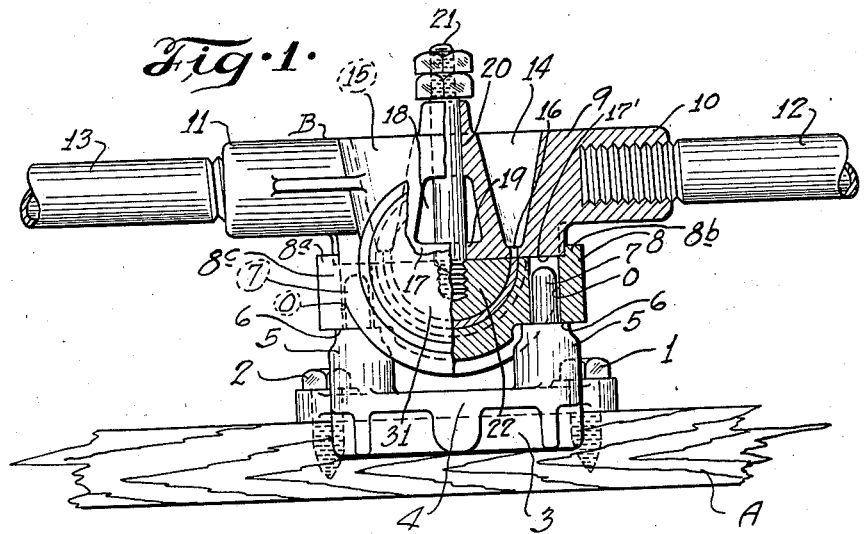
Figure 1 is an elevational view of a pouring jig constructed in accordance with and embodying our present invention, the jig being shown in co-operation with a bench-mounting for preparing the removable portion of an automotive main bearing.

Referring now in more detail and by reference characters to the drawings, which illustrate practical embodiments of our invention, A designates a portion of a workshop bench, table, or other permanent piece of workshop equipment, on which, by means of lag screws 1, 2, is rigidly mounted a bench-mounting or bracket 3 having a body-portion 4 fitting preferably flatwise along the top of the work-bench A and provided with a plurality of horizontally spaced upstanding shoulders 5 having upper faces 6 which are milled or otherwise machined to lie mutually and precisely in a unitary horizontal plane.

Extending vertically upwardly from each of the respective shoulder-faces 6, is a stud 7, which, together with their corresponding shoulders 5, are so positioned with respect to each other that each stud 7 will loosely fit into a respective standard bolt hole o provided in the removable shell portion, or, as it is most frequently called, bearing cap, 8 of a selected automotive main bearing. Thus, the bearing-cap 8, as shown in Figure 1, may be placed down over the studs 7 into flushwise supporting engagement with the upper faces 6 on the shoulders 5.

Figure 6:
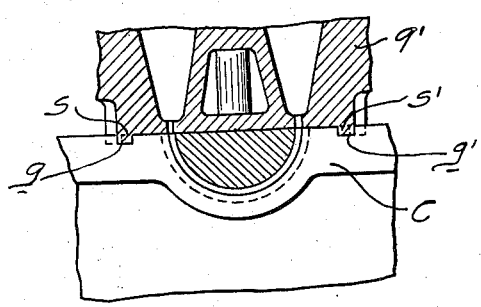
Figure 6 is a fragmentary sectional view of a slightly modified pouring-jig embodying our invention, especially adapted for use in pouring the stationary or fixed portion of an automotive main bearing, in co-operation with the automotive cylinder block.

In present automotive engineering practice, bearing caps, such as the cap 8, are provided with accurately machined radially arcuate, upstanding positioning-shoulders 8a and 8b, as seen in Figure 1, which fit precisely in machined grooves g, g', (as best seen in Figure 6) formed in the stationary or journal part of the main bearing, and which may be availed of, in accordance with our present invention, for properly positioning the pouring jig B with respect to the particular bearing-cap 8, as will presently more fully appear.

The pouring jig or tool proper B comprises a preferably cast central main or body-portion 9 provided with diametrically opposed outwardly horizontally extending sleeves 10, 11, which are internally threaded, as shown, to receive suitable handle members 12, 13.

Figure 2:
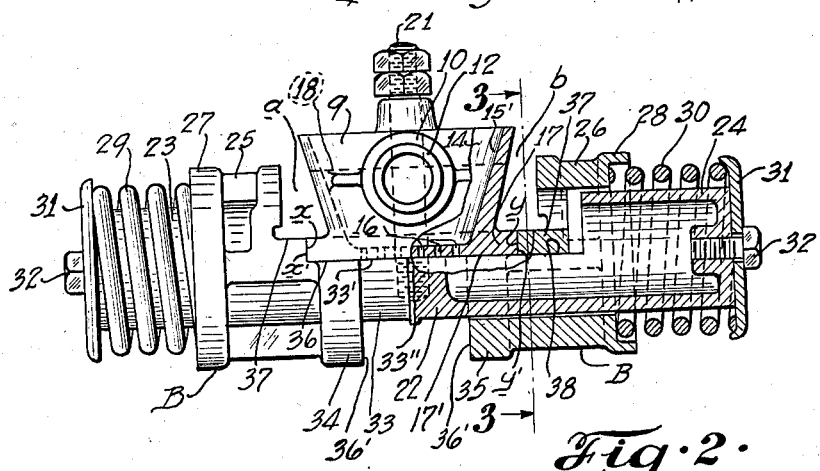
Figure 2 is an end elevational view of the jig, partially broken away and in section for disclosing its internal structure.
Figure 5:
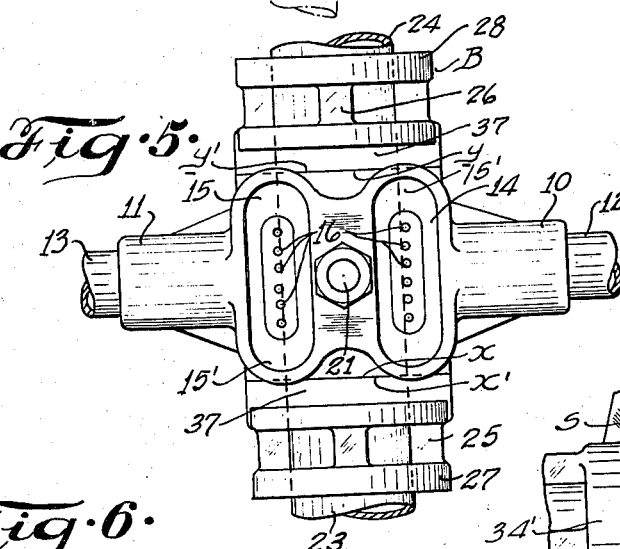
Figure 5 is a fragmentary top plan view of the jig.

Formed in the body-portion 9, is a pair of spaced open-top symmetrically positioned molten metal receiving chambers or reservoirs 14, 15, preferably of somewhat elliptical shape in plan view, as best seen in Figure 5, and whose side walls 15′ extend obliquely inwardly and downwardly substantially as shown in Figures 1 and 2, in so-called funnel-shape or gate formation for facilitating metal flow, each chamber 14, 15, being also provided with a plurality of outlets or spouts 16 which open to the under face 17′ of the bottom wall 17 of the body 9.

Also formed in, and extending transversely through, the body-portion 9, is an air cooling-passage 18, and disposed centrally of the body-portion 9 between the chambers 14, 15, are vertically extending axially aligned apertures 19, 20, for rotatively receiving a pivot-bolt 21, as best seen in Figure 1.

Figure 4:
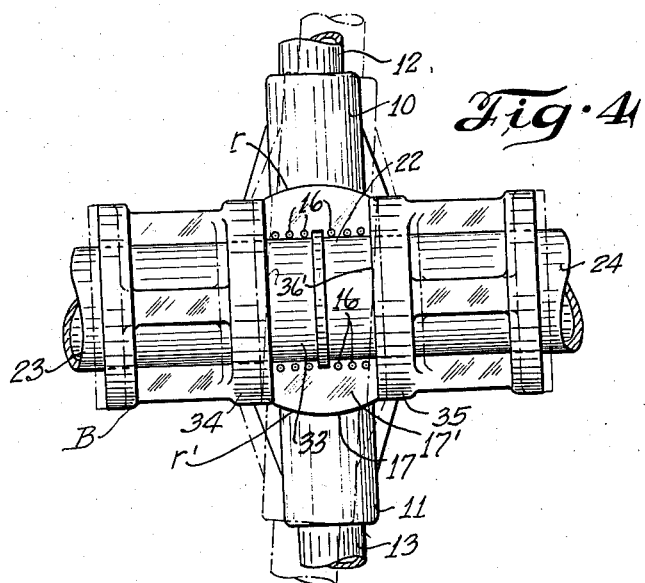
Figure 4 is a fragmentary inverted plan view of the jig.

The bottom wall 17 of the body-portion 9 is provided with what may be described as an outwardly presented marginal extension whose side face includes opposed parallel portions x, y, arcuately connected by opposed end portions r and r', as best seen in Figures 4 and 5, all for purposes presently more fully appearing.

Threaded upon the lower end of the pivot-bolt 21 for rotative flush-wise engagement with the under face 17' of the bottom wall 17 of the body structure 9, is a mold member or former 22, which is provided at its opposite ends with laterally outwardly projecting cylindrical enlargements or barrel-extensions 23, 24, upon which are mounted for shiftable movement sleeves 25, 26, formed with outwardly presented annular flanges or collars 27, 28, for embracingly receiving the inner ends of helical springs 29, 30, coiled on the extensions 23, 24, and impinging at their respective outer ends against circular end-plates or disks 31, 31, firmly secured on the extensions 23, 24, by suitable bolts 32, 32, as best seen in Figure 2.

The portion or section 33 of the former 22 intermediate the barrels or extensions 23, 24, which is engaged by the bolt 21, is semi-circular in cross-section having a radius equal to the desired inside radius of the bushing or bearing to be poured and molded, and having a flat upper marginal face 33' for snug flush-wise engagement with the under flat face 17' of the bottom wall 17 of the body structure 9, the section 33 being also provided with a centrally disposed peripheral ridge 33" for forming the usual oil channel in the finished bearing. It should be noted that, although the oil-channel-forming ridge 33" is shown here as a simple semi-circular structure, other shapes and conformations may be similarly provided and utilized.

The sleeves 25, 26, as also best seen in Figure 2, are axially spaced from the body structure 9 to provide channels a, b, peripherally around the outside of the chambers 14, 15, for the free circulation of air, the sleeve members 25, 26, being also provided at their respective inner ends with semi-circular bearing contacting shoulders 34, 35, for slidable engagement along their upper marginal faces 36, with the under face 17' of the bottom wall 17 of the body structure 9 and for also abuttingly engaging at their respective inner side faces 36' the perpendicular marginal or side faces of the main bearing, not shown, in a manner presently described.

Figure 3:
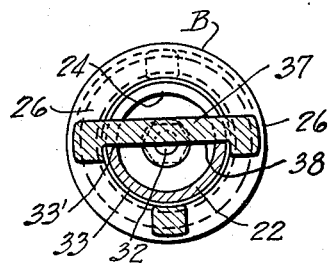
Figure 3 is a detail sectional view of the jig, taken approximately along the line 3—3, Figure 2.

Forming part of the sleeves 25, 26, and disposed diametrically between the outer end-flanges 27, 28, and the inner contacting shoulders 34, 35, respectively, as best seen in Figures 2 and 3, are so-called plate-segments or extensions 37, 37, having flat under faces 38, 38, for slidably engaging the flat upper marginal face 33' of the former or mold 22, and being provided with side shoulder faces x', y', for abutting engagement with the shoulder faces x, y, respectively, of the body-portion 9.

Thus, in utilizing the tool or jig for pouring and molding the bushing in the removable portion of an automotive main bearing or bearing-cap, as it is customarily called, the body structure 9 is pivoted about the bolt 21 with respect to the former 22, whereupon the faces x and y of the body structure 9 move angularly away from the faces x', y', of the sleeves 25, 26, as indicated in dotted lines in Figure 4, thereby forcing the sleeves 25, 26, longitudinally outwardly along the barrel extensions 23, 24, against the tension of the helical springs 29, 30, and correspondingly widening the distance or space between the contacting shoulders 34, 35.

The bearing cap 8 is then positioned upon the studs 7 of the bracket 3, as above described, and the pouring jig placed downwardly thereupon in such manner that the intermediate or central section 33 of the former 22 lies within the bearing cap. The body-structure 9 is then pivoted reversely to its original position, whereupon the end arcuate faces r, r', thereof will move into positioning engagement between the upstanding shoulders 8$^a$, 8$^b$, of the bearing cap 8, and the sleeves 25, 26, will be yieldingly urged by the springs 29, 30, into tight abutting engagement with the side faces 8$^c$ of the bearing-cap. Since the normal distance between the contacting shoulders 34, 35, is precisely equivalent to the width of the bearing-cap 8, the shoulder faces x', y', of the sleeves 25, 26, will consequently return to normal abutting engagement with the faces x, y, of the body structure 9, as above described, thereby accurately positioning the pouring jig both longitudinally and transversely upon the bearing-cap 8.

Further, since the intermediate or central portion 33 of the former 22 is externally shaped exactly to correspond to the desired inside contour of the bearing bushing being poured and molded, it will be evident that the external peripheral surface of the former 22 will be spaced radially from the inside peripheral surface of the bearing-cap 8 a distance equal to the desired thickness of the bearing bushing when poured. Similarly, the faces of the contacting shoulders 34, 35, define the perpendicular end faces of the bearing bushing when poured.

Thus positioned, the entire assembly is heated with a torch or other suitable means until hot enough to receive the Babbitt or bearing metal, whereupon the molten metal is poured into the chamber 14 of the body structure 9 and courses down through the openings or spouts 16 thereof into the space between the former 22 and the bearing-cap 8, filling such space entirely and flowing upwardly through the other openings or spouts 16 in the reservoir 15, sufficient molten metal being poured into the chamber 14 to fill both chambers 14 and 15 for a substantial distance above the spouts or openings 16 to insure complete formation of the bearing bushing.

By reason of the fact that air may freely circulate around the body structure 9 through the air passage 18 and the channels a and b, very rapid efficient cooling of the entire assembly will occur, and the molten metal will solidify without any appreciable waste of time.

As soon as the metal has solidified, the handles 12, 13, are firmly grasped and the body structure 9 sharply pivoted about the pivot pin 21, which action simultaneously accomplishes several important functions. In the first place, the under face 17' rides over the upper marginal face 33' of the former 22 and accurately shears off the bearing metal in the bushing from the so-called risers or little integral necks or chimneys of metal left in the spouts 16 of the body structure 9. Secondly, such shearing action tends to move the body structure 9 and the former 22 very slightly, but nevertheless perceptibly, away from each other relatively along the pivot bolt 21, which is sufficient to initially "ram home" the bushing. Thirdly, the pivoting movement of the body structure 9 forces the sleeves 25, 26, outwardly along the barrel-extensions 23, 24, away from the side faces of the bushing. Finally, as the air rushes in against the interior of the former 22 and the bearing-cap 8, the heated members cool somewhat and contract away from each other, so that the entire pouring jig may then be readily lifted out of the now finished bearing-cap 8.

Figure 7:
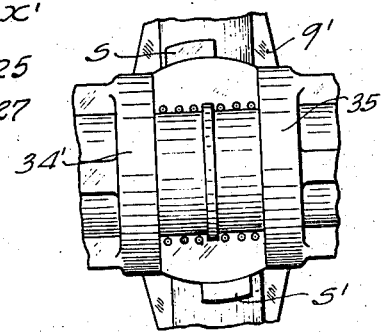
Figure 7 is a fragmentary inverted plan view of the modified pouring jig of Figure 6.

In pouring the bushing for the stationary or journal part of a main bearing, the modified form of pouring jig shown in Figures 6 and 7 is utilized. Such modified form of jig is in all respects identical in form and operation to the jig previously described, except that radially arcuate shoulders s, s', as best seen in Figures 6 and 7, are substituted for the arcuate end faces r, r', which shoulders are, in effect, counterparts of the upstanding shoulders 8a, 8b, of the bearing-cap 8 previously described and similarly fit into the radially arcuate grooves g, g', formed in the cylinder block for engagingly receiving the shoulders 8a, 8b, of the bearing-cap 8.

Thus, in pouring the bushing for the stationary or journal bearing, the body structure 9', as shown in Figures 6 and 7, is pivoted to widen the longitudinal distance between the contacting shoulders 34', 35', whereupon the jig may be placed down into the bearing structure C and the body structure 9' reversely pivoted to position the shoulders s, s', thereof in the grooves g, g', the pouring and jig removing operations being then carried out precisely in the manner previously described.

When the pouring jig has been removed from the bearing structure C, the bearing-cap 8 may be installed thereon for subsequent "line-boring" in any conventional manner.

It will be understood that changes and modifications in the form, construction, arrangement, and combination of the several parts of the tool may be made and substituted for those herein shown and described without departing from the nature and principle of our invention.

Having thus described our invention, what we claim and desire to secure by Letters Patent is:

1. A pouring jig adapted for cooperation with an automotive-bearing support structure to provide a bearing-forming mold, said jig comprising a former having a flat upper face and bodily contoured conformably with the bearing arms extending laterally in opposed relation from the former, spring-pressed sleeves mounted for yielding movement lengthwise on said arms, said sleeves having opposed shoulders for abuttingly engaging the bearing-supporting structure in the formation of mold cavity end walls and a pouring cup pivotally mounted intermediate the sleeves for rotative movement over and relative to the former, said cup integrally including a bottom wall flatwise engaging at its under face the upper face of the former and being provided with a plurality of laterally spaced apertures of diametrical size substantially equivalent to the transverse width of the mold cavity, said apertures further having edges in the plane of said under face for cooperation with contiguous edges of the mold cavity for shearing off the poured bearing metal precisely in the plane of the bearing top face upon rotary movement of the pouring cup.

2. A pouring jig adapted for cooperation with an automotive-bearing support structure to provide a bearing-forming mold, said jig comprising a former having a flat upper face and bodily contoured conformably with the bearing arms extending laterally in opposed relation from the former spring-pressed sleeves mounted for yielding movement lengthwise on said arms, said sleeves having opposed shoulders for abuttingly engaging the bearing-supporting structure in the formation of mold cavity end walls and a pouring cup pivotally mounted intermediate the sleeves for rotative movement over and relative to the former, said cup integrally including a bottom wall flatwise engaging at its under face the upper face of the former and being provided with a plurality of laterally spaced apertures of diametrical size substantially equivalent to the transverse width of the mold cavity, said apertures further having edges in the plane of said under face for cooperation with contiguous edges of the mold cavity for shearing off the poured bearing metal precisely in the plane of the bearing top face upon rotary movement of the pouring cup, said pouring cup having a pair of laterally presented parallel side faces for flatwise abutting engagement with the sleeves respectively, said parallel faces being at their extremities cross-connected by arcuate faces, whereby the sleeves will simultaneously be moved sharply outwardly from mold forming position during initial metal shearing rotation of the pouring cup and will subsequently ride upon the arcuate faces and be held out of mold forming position thereby.

3. A pouring jig adapted for cooperation with an automotive-bearing support structure to provide a mold for forming a substantially hemi-cylindrical mold-cavity, comprising a substantially hemi-cylindrical former having a flat upper face, a pouring cup pivotally mounted on said upper face and having a lower flat face receivable flatwise upon and in the plane of, the open side of the bearing support structure to position the substantially hemi-cylindrical former in spaced relation therefrom, and means to close the ends of the bearing structure, said pouring-cup having a plurality of apertures formed through the bottom thereof and arranged in a substantially straight line, contiguous to straight edges of the mold-cavity, and of diametrical extent substantially equal to the transverse dimension of said mold-cavity for cooperation with said edges of the mold-cavity to shear off the poured bearing metal upon rotary movement of the pouring cup.

MICHAEL HOLHUT.
WALTER G. VOLLMER.